United States Patent [19]

Klak

[11] Patent Number: 5,474,103
[45] Date of Patent: Dec. 12, 1995

[54] SAFETY GUARD FOR ORIFICE FITTING DEVICE

[76] Inventor: Steven P. Klak, 9606 Brookhaven Park Dr., Houston, Tex. 77065

[21] Appl. No.: 408,347

[22] Filed: Mar. 22, 1995

[51] Int. Cl.⁶ .............................. G01F 1/42; F16K 35/00; F16K 43/00
[52] U.S. Cl. ...................... 137/315; 73/861.61; 137/382; 138/44; 138/94.3; 251/94; 251/282
[58] Field of Search ............................ 73/861.61, 861.62; 137/315, 377, 381, 382; 138/44, 94, 94.3; 251/94, 282

[56] References Cited

U.S. PATENT DOCUMENTS

| | | | |
|---|---|---|---|
| 1,965,826 | 7/1934 | Daniel | 138/44 |
| 1,996,192 | 4/1935 | Daniel | 138/44 |
| 2,217,216 | 10/1940 | Davis | 138/44 |
| 2,234,795 | 3/1941 | Brown | 251/94 |
| 2,407,951 | 9/1946 | Daniel | 138/44 |
| 2,688,987 | 9/1954 | Whalen | 138/44 |
| 3,079,796 | 3/1963 | Freudenthal et al. | 73/861.62 |
| 3,105,384 | 10/1963 | Hodgeman et al. | 73/861.62 |
| 3,124,158 | 3/1964 | Penfold | 251/94 |
| 4,014,366 | 3/1977 | Critendon | 138/94.3 |
| 5,026,021 | 6/1991 | Pino | 251/94 |
| 5,042,531 | 8/1991 | Foster et al. | 138/44 |
| 5,050,842 | 9/1991 | Foster et al. | 251/176 |
| 5,094,272 | 3/1992 | Foster et al. | 138/44 |
| 5,186,474 | 2/1993 | Jacobs | 138/44 |
| 5,318,073 | 6/1994 | Kendrick et al. | 138/94.3 |

OTHER PUBLICATIONS

Daniel Industries, Inc. of Houston, Tex., Senior Orifice Fitting Technical Manual, Catalog 100A, 1991, pp. 1–9.

*Primary Examiner*—George L. Walton
*Attorney, Agent, or Firm*—Bush, Moseley, Riddle & Jackson

[57] ABSTRACT

A safety guard or lockout device (22) for a dual chamber orifice fitting device (1) having a removable orifice plate (4). In a normal position when the upper and lower chambers (8, 9) are equal in pressure, the guard (50) of the safety guard device (22) is in a retracted position relative to the square end (36) of a valve gear shaft (18) as shown in FIG. 3 to permit connection of a manual tool, such as a wrench, to square end (36) of valve gear shaft (18) for actuation of isolation valve member (16). When changing the orifice plate (4), the pressure in the upper chamber (8) is reduced to atmospheric conditions and provides a fluid pressure differential between chambers (8) and (9). The fluid pressure differential moves fluid responsive member (30) and guard (50) to an extended position covering the square end (36) of valve gear shaft (18) to prevent access of a manual tool to the shaft (18) thereby preventing operation of the isolation valve (16) separating the upper chamber (8) from the lower chamber (9).

9 Claims, 2 Drawing Sheets

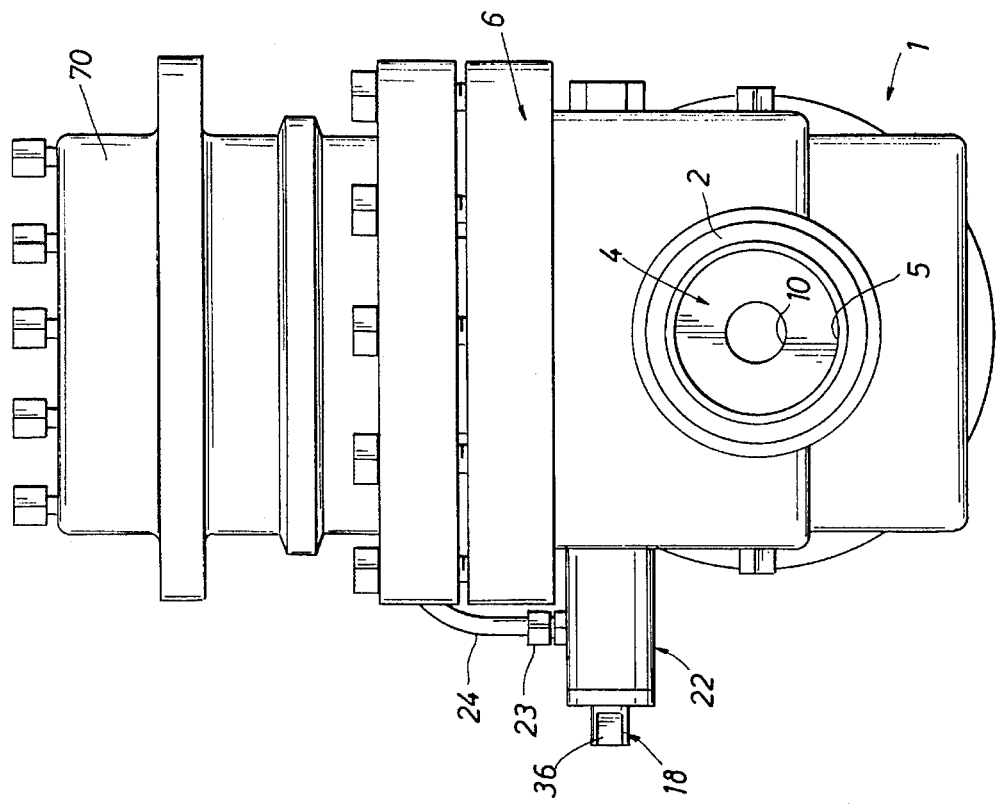
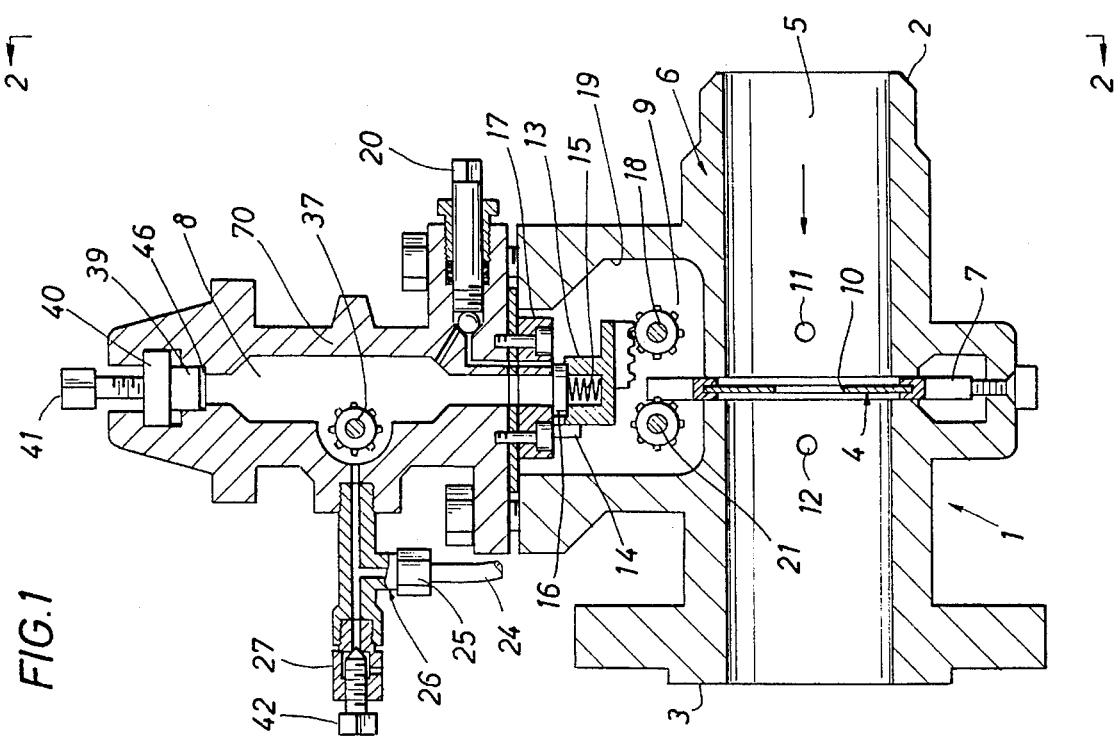

SAFETY GUARD FOR ORIFICE FITTING DEVICE

FIELD OF THE INVENTION

This invention relates in general to a dual chamber orifice fitting device having a removable orifice plate for measuring fluid flow in a flow line, and particularly to a safety device that prevents inadvertent actuation of a valve member separating the dual chambers by an operator.

BACKGROUND OF THE INVENTION

Heretofore, dual chamber orifice fitting devices have been used for measuring the flow of fluids through pipe while utilizing an orifice plate in the flow line. An orifice plate consists of a flat plate with a predetermined opening therein. By measuring the pressure differential on opposite sides of the orifice plate, the rate of fluid flow can be determined in the pipeline.

An orifice plate must be maintained in relatively good condition to assure measurement accuracy. The opening or bore of the plate must remain clean and its upstream edge must remain sharp and free of nicks. Debris or foreign matter built up on the faces of the plate can also adversely affect the accuracy of the flow measurement. Since the fluid flowing in pipelines may contain substances or particulates which may adversely affect the orifice plate, it is desired that the plate be periodically inspected. In fact, it is common practice in the industry and even recommended that the plate be inspected on a periodic basis, such as each month. This inspection involves removing the orifice plate from the pipeline, inspecting it, and either reinstalling it in the pipeline or, should its condition require, replacing the orifice plate. Also, in the event flow conditions change, such as an increase or decrease in the fluid flow rate, an orifice plate with a larger or smaller opening or bore may be required. This would require removing the old orifice plate and replacing it with a new one with a different bore. In either of the aforementioned situations, it is necessary to provide a means for the removal and installation of the orifice plate in the orifice fitting or flow measurement device.

It is desirable that the orifice plate be removed and replaced without shutting down the pipeline so that flow through the pipeline is maintained. For this purpose, a dual chamber orifice fitting device has been provided in which an inner or lower chamber is provided in continuous fluid communication with the flow line while an outer or upper chamber is isolated for removal of the orifice plate. A valve member or isolation member is positioned between the chambers and when closed to separate the chambers, the outer chamber may be exposed to atmosphere. However, the lower chamber does not have to be reduced to atmospheric conditions to remove the orifice plate from the pipeline. Thus, the flow of fluid does not have to be stopped.

One of the most common designs for a dual chamber orifice fitting device is a "Senior Orifice Fitting" manufactured and sold by Daniel Industries, Inc. of Houston, Tex. and described in Catalog 100A, entitled "Senior Orifice Fitting Technical Manual", published by Daniel Industries, Inc. This design is also disclosed in U.S. Pat. Nos. 1,996,192 and 2,688,987, which are incorporated by this reference.

In most dual chamber orifice fitting devices, an operator must rotate at least two, and possibly three, shafts to effect removal and replacement of an orifice plate. The shafts, in turn, rotate gears that provide a means for raising or lowering the orifice plate between the chambers, or a means for opening and closing an isolation valve between the chambers that will isolate the upper chamber from line pressure. In addition to rotating these shafts, the operator must rotate other devices, such as a bleed valve that can reduce the internal pressure of the outer chamber to atmospheric conditions, a valve that can equalize the pressure between the upper and lower chambers, or bolting to open the upper chamber. Thus, many steps are involved in the removal and installation of an orifice plate. To facilitate the process, some manufacturers have standardized on the wrench required to operate the shafts, valves, and bolting. An operator may use the same wrench in each of these steps while moving the same wrench from various shafts, valves, and bolts, or the operator may choose to use more than one wrench, but in all situations there are many steps required to remove and install an orifice plate and an operator must turn a number of items in the proper sequence.

The relatively large number of steps to remove and install an orifice plate can be confusing to an operator. To assist the operator in operating the device, manufacturers place instruction plates on the orifice fitting devices to help guide the operator through the procedure in the proper sequence. However, due to paint or a build up of foreign matter on the instruction plate, or through natural weathering, the instruction plate is often difficult or impossible to read. In addition, instruction plates, name plates and the like, are often removed from valves and orifice fitting devices prior to painting and are not always repositioned after the painting. Thus, the operator operating the orifice fitting device is often without instructions readily available, a circumstance that can add to a possibly confusing situation. Even if the instruction plate is present and readable, an operator may not read it as each step is performed due to the familiarity of the operator with the procedure. An operator may also momentarily forget the proper sequence of steps or become confused. In addition, most manufacturers standardize on a common side of the orifice fitting device on which the shafts are exposed for operation. Sometimes the operating shafts are located on a side other than the normal side to facilitate the positioning of an orifice fitting device within a limited space. This alternate placement of the operating shafts requires that the shafts be rotated differently with regard to previously known procedures and this can also cause confusion.

In all of the above mentioned designs or orifice fitting devices, a dangerous condition may occur when the internal pressure of the upper chamber is reduced to atmospheric conditions and the upper chamber itself is opened for removal of the orifice plate. When this condition occurs, the valve or device that isolates or separates the upper and lower chambers is the only member that prevents the line pressure from rapidly exhausting through the outer opening of the upper chamber. The operator operating the orifice fitting device must be careful not to open the isolation valve between the inner and outer chambers. If the isolation valve is opened when the upper chamber is opened to atmosphere, highly pressurized fluid from the main flow line will rapidly vent through the rather large opening between the upper and lower chambers and out through the upper opening of the upper chamber into the atmosphere. Obviously, this is not a safe condition for the operator operating the orifice fitting device as the operator is usually in very close proximity to the opening to atmosphere. Further, when reinstalling an orifice plate in many designs of the orifice fitting device, a relatively large metal plate or carrier for the circular orifice plate is placed within the upper chamber. An operator must proceed with a number of steps to close the upper chamber, isolate the upper chamber from atmosphere, and repressurize the upper chamber. However, as mentioned before, the operator may become confused and forget to take the steps in sequence and may inadvertently open the isolation valve between the chambers before isolating the upper chamber from atmosphere. As soon as the isolation valve between the chambers is opened, the rapidly escaping pressurized fluid rapidly forces any unsecured member, such as a carrier device, out of the upper chamber resulting in possible damage to property or injury to personnel.

Because of the complexity of operating such a dual chamber orifice fitting device and the resulting possibility that an operator may perform an operating step out of the proper sequence, particularly opening the isolation valve between the dual chambers out of sequence, there is a need for a safety device or interlock that will effectively prevent an operator from manually opening an isolation valve between the dual chambers when a pressure differential exists in the two chambers.

SUMMARY OF THE INVENTION

The present invention discloses a safety guard device for a dual chamber orifice fitting device to prevent the opening of an isolation valve between the dual chambers when a pressure differential exists between the chambers. The orifice fitting device includes a shaft for actuating the isolation valve member between the chambers and an end of the shaft extends externally of the housing or body of the orifice fitting device. A tool connector on the end of the shaft is manually engaged by a tool such as a wrench. The safety guard device includes a fluid pressure responsive member that is movable to a position for blocking access to the external tool connector, such as a square tool fitting on the end of the shaft, when a fluid pressure differential exists in the dual chambers, and movable to a position for permitting access to the external tool connector to permit actuation of the valve member between the chambers when the fluid pressure in the fluid chambers is equalized.

The fluid pressure responsive member includes an end guard or sleeve mounted for movement to an extended covered position of the tool connector on the end of the shaft when a fluid differential exists between the chambers to prevent a tool fitting on the tool connector in the extended covered position. When the fluid pressure between the chambers is equalized, the sleeve is retracted from the tool connector to uncover the tool connector to permit an operator to place a tool on the tool connector for rotation of the shaft. As mentioned previously, only when the two fluid chambers are of equal pressure should the isolation valve between the fluid chambers be operated. When the upper chamber is of a lesser pressure than the lower chamber, the fluid chamber in the lower chamber is effective to move the sleeve over the tool connector on the external end of the shaft to prevent access to the shaft by a wrench or any other means. By doing so, the isolation valve cannot be opened, intentionally or otherwise, thereby eliminating a possible dangerous situation. Once the upper and lower chambers are returned to equal pressure, as when the orifice plate is reinstalled in the orifice fitting device and the upper chamber is closed to atmosphere, the sleeve over the tool connector on the end of the shaft is retracted to allow wrench access to the shaft. The fluid connection to the upper chamber pressure is through an external tubing connected between the safety guard and a tee connection located between a bleed valve and the upper chamber. Opening the bleed valve to reduce the internal pressure of the upper chamber activates the fluid pressure responsive member of the safety guard device forcing it out over the end of the operating shaft.

As an added feature, a spring continuously urges the fluid pressure responsive member to a retracted position so that the sleeve or guard is retracted when there is no pressure in the orifice fitting device, such as when the orifice fitting device is not in service. This allows an operator to operate the isolation valve prior to installation. An inspector may also check the functioning of the orifice fitting device prior to pressuring or installing the orifice fitting device in a pipeline.

The safety guard device of the present invention is designed to be readily installed on a new orifice fitting device, or as a retrofit on existing orifice fitting devices in service in the field. The orifice fitting devices already in service in the field are easily retrofitted by isolating an orifice fitting device from line pressure and installing the safety guard device.

BRIEF DESCRIPTION OF THE DRAWINGS

FIG. 1 is a longitudinal sectional view of a typical dual chamber orifice fitting device having a removable orifice plate;

FIG. 2 is a front elevation of the orifice fitting device shown in FIG. 1;

DETAILED DESCRIPTION OF THE INVENTION

Figure 3:
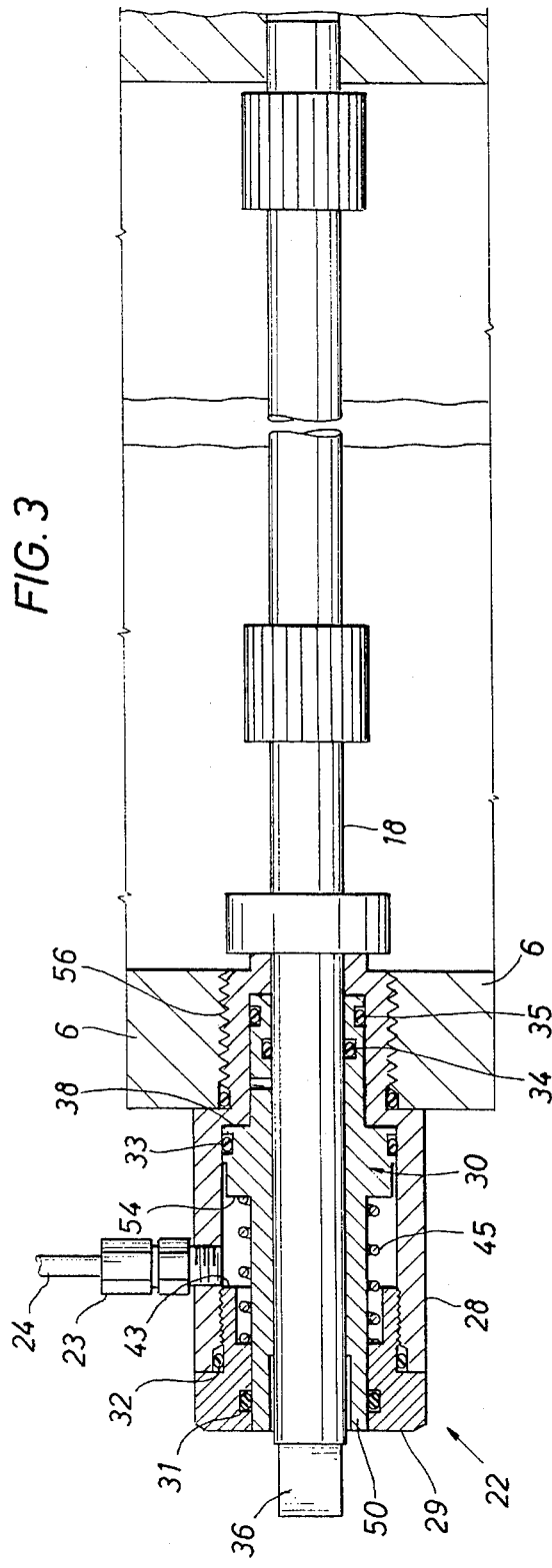
FIG. 3 is a cross sectional view of the safety guard device of the present invention with the guard or sleeve in a retracted position in which fluid pressure in the dual chambers is equalized.

Referring now to the drawings for a better understanding of this invention, FIG. 1 shows a cross section of a typical dual chamber flow measuring or orifice fitting device designated generally at 1. Orifice fitting device 1 is connected to a pipeline that transports fluids, such as natural gas, at weld bevel 2 at one end and flange 3 at an opposed end. The normal direction of fluid flow is indicated by the arrow shown in FIG. 1, but fluid may flow in the opposite direction. The dual chamber orifice fitting device 1 has a body 6 defining a lower chamber 9 and a bonnet 70 secured to body 6 and defining an upper chamber 8. In this normal operation, an orifice plate 4 is located in the fluid flow path 5 and is held in place by a plate carrier 7 and positioning equipment (not shown) in body 6. As fluid flows through orifice plate bore 10, a pressure differential develops and is sensed by externally mounted, specialized pressure measuring equipment through holes 11 and 12. Also, while in the normal operation, a slide valve carrier 13 abuts a stop pin 14 so that a valve member 16 for separating or isolating chambers 8 and 9 is properly centered over a rectangular slot in valve seat 17. Valve member 16 is constantly urged against seat 17 by a plurality of springs 15 and defines an isolation valve between chambers 8 and 9. When required, valve carrier 13, valve member 16, and springs 15 can be moved to the right by rotating a valve gear shaft 18 until slide valve carrier 13 contacts the inside wall of lower chamber 9 at 19. When in this position, valve carrier 13 and valve member 16 are completely clear of the rectangular slot in valve seat 17. This positioning is required to allow orifice plate 4 and plate carrier 7 to pass through the rectangular slot in valve seat 17. The sequence required to accomplish this will be set forth hereinafter.

Referring now to FIG. 2, the safety guard or lockout device, generally referred to as 22, is mounted externally on body 6 adjacent lower chamber 9 to prevent inadvertent actuation of valve member 16. Valve gear shaft 18 extends through body 6. A tubing connector 23 is fastened to safety guard device 22. Tubing 24 is connected at its lower end to tubing connector 23 to provide a pressure tight connection between safety device 22 and a tee connection 26 on bonnet 70 adjacent upper chamber 8 as shown in FIG. 1. The other upper end of tubing 24 is connected to tubing connector 25 on tee connection 26. An end of tee connection 26 has a bleed valve 27 secured thereto. The other end of tee connection 26 is secured externally to bonnet 70 adjacent upper chamber 8.

Figure 4:
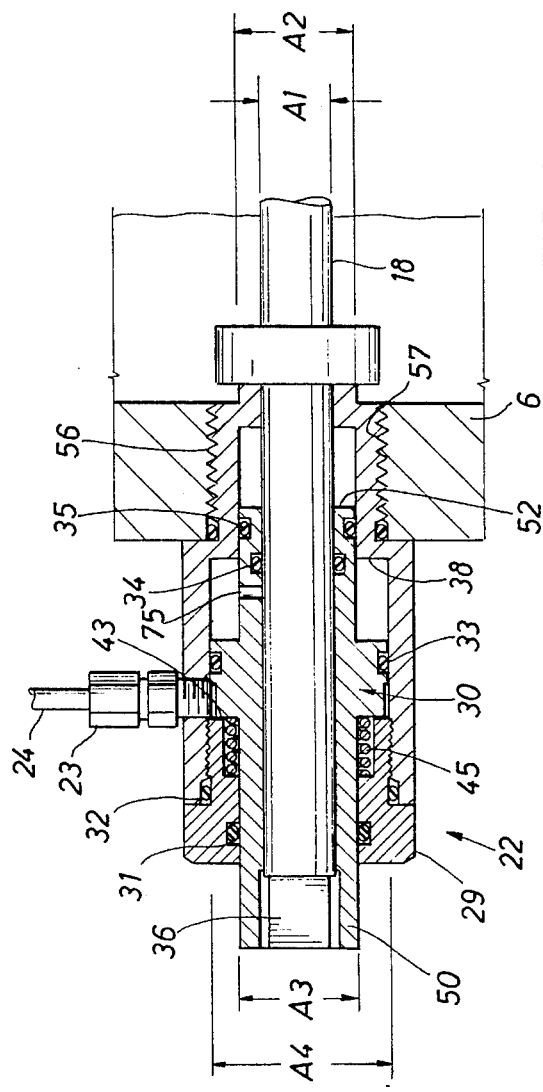
FIG. 4 is a cross sectional view of the safety guard device shown in FIG. 3 in which fluid pressure in the dual chambers is not equal with the guard or sleeve in an extended position over the tool connector of the shaft to prevent tool access to the tool connector.

Referring to FIG. 1, when it becomes necessary to remove orifice plate 4 from orifice fitting device 1 for inspection or replacement, an equalizer valve stem 20 is rotated counterclockwise to allow the fluid pressure in lower chamber 9 and upper chamber 8 to be equalized. When this occurs, the safety guard device 22 is actuated. Referring to FIG. 3, the safety guard device 22 includes a body 28, an end plug 29, a spring 45, and O-rings 31, 32, 33, 34, and 35. A fluid responsive piston member 30 is mounted within body 28 about valve gear shaft 18 for movement between a retracted position shown in FIG. 3 and an extended position shown in FIG. 4. Valve gear shaft 18 has a square end 36 defining flats which form a tool connector for engagement by a suitable manual tool, such as a wrench, to rotate gear shaft 18 for movement of valve member 16 between opened and closed positions relative to chambers 8 and 9. Piston member 30 includes an outer guard or end sleeve 50 which is adapted to fit over square end 36 in an extended position as shown in FIG. 4. Piston member 30 has an inner end 52 opposite guard 50 which is exposed to fluid pressure from chamber 9. An annular shoulder 54 on piston member 30 is exposed to fluid pressure from upper chamber 8 through tubing 24 as shown particularly in FIG. 3. End plug 29 is threaded within body 28 about outer guard or sleeve 50. Spring 45 urges guard 50 and piston member 30 to a retracted position as shown in FIG. 3. O-rings 34 and 35 provide a fluid pressure area at areas A1 and A2 adjacent end 52 of piston member 30 which is in fluid communication with lower chamber 9 by fluid leakage from chamber 9 past body 28 and gear shaft 18. A suitable opening, if desired, may be provided for leakage from chamber 9 to piston member 30. Body 28 of safety guard device 22 has an externally threaded inner end at 56 which is threaded within internally threaded openings 57 to body 6 of orifice fitting device 1 as indicated in FIGS. 3 and 4. O-ring 35 seals between piston member 30 and body 28. O-ring 34 seals between piston member 30 and gear shaft 18. O-rings 31 and 33 provide a fluid pressure area at areas A3 and A4 of piston member 30 which is in fluid communication with upper chamber 8. O-ring 31 seals between guard 30 and end plug 29. O-ring 32 seals between end plug 29 and body 28. O-ring 33 seals between guard 30 and body 28. The fluid pressure area at areas A3 and A4 is greater than the fluid pressure area at areas A1 and A2 to provide a fluid pressure differential acting on piston member 30 when the pressure is equal in chambers 8 and 9.

Figure 5:
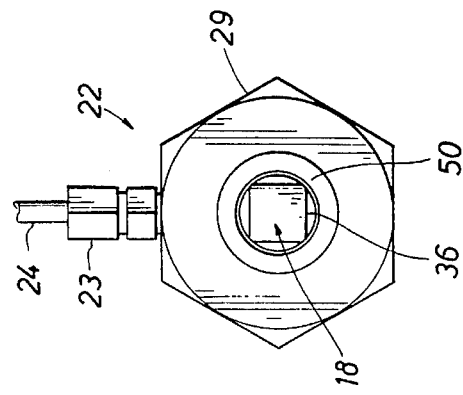
FIG. 5 is an end view of the safety guard device shown in FIGS. 3 and 4.

End guard or sleeve 50 may be retracted away from the end of valve gear shaft 18 which defines square end 36 thereon. Alternately, guard 50 may be extended out over square end 36 of valve shaft 18 preventing a wrench to be connected to square end 36 thus making valve gear shaft 18 inaccessible and preventing manual operation of valve member 16. As shown in FIG. 5, the close proximity of the outer surface of valve gear shaft 18 and square end 36 to the inner surface of guard 50 prevents affixing of a wrench to valve gear shaft 18.

As previously stated, the first step in removing orifice plate 4 is to equalize the pressure between lower chamber 9 and upper chamber 8. The area defined by A4 minus A3 exposed to fluid pressure from chamber 8 is greater than the area defined by A2 minus A1 exposed to fluid pressure from chamber 9 thereby to urge piston member 30 to a retracted position shown in FIG. 3. Spring 45 also continuously urges piston member 30 to a retracted position in which piston member 30 abuts body 28 at shoulder or abutment 38. In this position, guard 30 is in a retracted position and allows a wrench or other tool to be connected to square end 36 of gear shaft 18 for movement of valve member 16 to an open position.

Valve carrier 13 is moved to the right until it abuts lower chamber wall 19. The orifice plate 4 and carrier 7 can then be raised into chamber 8 by rotating gear shafts 21 and 37 until plate carrier 7 contacts an upper gasket 46 as shown in FIG. 1. Valve gear shaft 18 is then rotated in an opposite direction so that valve carrier 13 is moved to the left until it again abuts stop pin 14. In this position, valve member 16 is in closed position against seat 17 to separate lower chamber 9 and upper chamber 8. Equalizer valve stem 20 is then rotated clockwise to complete the pressure isolation of lower chamber 9 and upper chamber 8. Bleed valve stem 42 of bleed valve 27 is rotated counterclockwise to allow the pressure in upper chamber 8 to be reduced to atmosphere.

Now referring to FIG. 4, when the pressure in upper chamber 8 is at atmosphere, the higher pressure in lower chamber 9 acts against end 52 of piston member 30 between O-rings 34 and 35 to urge guard or sleeve 50 outwardly overcoming the force of spring 45 until shoulder 54 on piston member 30 abuts shoulder or abutment 43 on end plug 29. In this position, guard 50 is extended over the square end 36 of valve shaft 18 and prevents a manual tool from being connected to end 36. Thus, valve gear shaft 18 cannot be actuated and valve 16 remains in a closed position. As shown in FIG. 5, the close proximity of the outer surfaces of valve gear shaft 18 and square end 36 to the inner surface of guard 50 prevents connection of a tool to valve gear shaft 18. Referring to FIG. 1, to complete removal of orifice plate 4, clamping bar screws 41 are loosened for the removal of outer clamping bar 40, sealing bar 39, and gasket 46. Then, gear shaft 37 is rotated for upward movement of orifice plate 4 and plate carrier 7 for removal from the top of upper chamber 8. Piston member 30 has an exhaust opening 75 extending to shaft 18 to permit fluid leakage for preventing pressure lock of piston member 30.

To reinstall orifice plate 4, orifice plate 4 and plate carrier 7 are inserted within the upper end of upper chamber 8. Gear shaft 37 is then rotated to move the plate carrier assembly downwardly completely within upper chamber 8. Upper gasket 46, sealing bar 39 and clamping bar 40 are assembled onto orifice fitting device 1. Clamping bar screws 41 are then tightened. Bleed valve stem 42 is rotated clockwise, isolating chamber 8 from atmosphere. Equalizer stem 20 is then rotated counterclockwise equalizing the pressure between the lower chamber 9 and upper chamber 8. Upon equalizing of the pressure in chambers 8 and 9, the differential pressure area and spring 45 acting on piston member 30 moves piston member 30 to the retracted position of FIG. 3 until piston member 30 abuts shoulder 38 of body 30. In this position guard 50 is in a retracted position that allows a wrench or other manual tool to be connected to square end 36 of valve gear shaft 18 for movement of valve member 16 to an open position between chambers 8 and 9. Referring to FIG. 1, an operator can continue installing orifice plate 4 by rotating valve gear shaft 18 until valve carrier 13 once again abuts lower chamber wall 19. Gear shafts 37 and 21 are rotated to lower plate carrier 7 into its resting position in lower chamber 9. Valve gear shaft 18 is then rotated to move valve carrier 13 to a position abutting stop pin 14. For further details of the operation of orifice fitting device 1, reference is made to U.S. Pat. Nos. 1,996,192 and 2,688,987, which are incorporated herein by this reference.

Referring to FIG. 1, prior to installing orifice fitting device 1 in a pipeline, or when the pipeline is not pressurized and is at atmospheric conditions, there may be a desire to rotate valve gear shaft 18 for opening or closing valve member 16. Since the entire pipeline is at equal atmospheric pressure, guard 50 is not urged in any direction by fluid pressure. Spring 45 is the only force acting on guard 50 and urges guard 50 to a retracted position as shown in FIG. 3. This permits actuation of valve member 16 as it may be desirable to operate valve member 16 to test its functionality prior to starting up or pressurizing a pipeline, or to properly position valve member 16. Once pressure is applied to the pipeline, safety guard device 22 will operate as previously described.

When pressure is applied to orifice fitting device 1, the forces generated by the pressure acting on the differential fluid pressure area defined by the O-rings is much greater than the force generated by spring 45. It may be desirable in some instances to delete the spring. Then, guard 50 may be manually retracted if it is desired to operate the orifice fitting device without any pressure in the orifice fitting device or pipeline. Manually retracting guard 50 could be accomplished by simply pushing on the exposed end of guard 50 to uncover square end 36 so that a suitable tool may be connected thereto. Safety guard device 22 thus forms a lockout to prevent inadvertent actuation of valve member 16.

Safety guard device 22 may be utilized as a retrofit unit and installed when the orifice fitting device and the associated flow line are out of service. For installation of safety guard device 22, an externally threaded nut (not shown) about shaft 18 is unthreaded from internally threaded opening 57 in body 6 for removal of gear shaft 18 having square end 36 thereon. After the externally threaded nut is removed from internally threaded opening 57, gear shaft 18 may be removed and inspected for any possible damage. Gear shaft 18 may be reinserted or a new gear shaft 18 may be provided if needed. Upon reinsertion of gear shaft 18, safety guard device 22 is positioned about gear shaft 18 and externally threaded end 56 is threaded within internally threaded opening 57. Bleed valve 27 is removed from bonnet 70 and threaded into tee 26 which, in turn is threaded into bonnet 70. Tubing connectors 23, 25 and tubing 24 are then connected between safety guard device 22 and tee connection 26. Upon installation of safety guard device 22, orifice fitting device 1 is placed in service and pressurized.

While the present invention has been shown and described in its preferred embodiment, those skilled in the art will recognize from the foregoing discussion that various changes, modifications, and variations may be made thereto without departing from the spirit and scope of the invention as set forth in the claims. In addition, it is to be understood that the above details given are to be interpreted as illustrative and not in a limiting sense.

What is claimed is:

1. In combination with an orifice fitting device having an outer housing about a flow line, a removable orifice plate in the flow line, a pair of fluid chambers, a valve member for selectively separating said fluid chambers, and an external tool connector for said valve member for moving said valve member between an open position permitting fluid communication between said fluid chambers and a closed position blocking fluid communication between said fluid chambers, one of said fluid chambers being in continuous fluid communication with said flow line during operation of said flow measuring device;

the improvement comprising:
lockout means for said external manual operator to prevent inadvertent actuation of said valve member when the fluid pressure in the pair of fluid chambers is unequal, said lockout means including:
a body; and
fluid pressure responsive means mounted within said body and movable between a position for blocking actuation of said valve member and a position for permitting actuation of said valve member;
said fluid pressure responsive means responsive to a fluid pressure differential in said chambers and movable to a position for blocking actuation of said valve member when a fluid pressure differential exists in said chambers, and movable to a position for permitting actuation of said valve member when the fluid pressure in said fluid chambers is equalized.

2. The combination as set forth in claim 1 wherein:
a shaft is provided for actuation of said valve member and has an end extending outwardly of said outer housing; and said tool connector is provided on the extending end of said shaft and is adapted to be engaged by a suitable manually operated tool for actuation of said valve member.

3. The combination as set forth in claim 2 wherein:
said fluid pressure responsive means includes an outer sleeve which is movable over said tool connector in an extended position to block access to said tool connector and actuation of said valve member when the fluid pressure in said fluid chambers is unequal, and movable to a retracted position permitting access to said tool connector and actuation of said valve member when the fluid pressure in said fluid chambers is substantially equalized.

4. The combination as set forth in claim 2 wherein:
said lockout means is positioned about said shaft externally of said outer housing and has an outer sleeve mounted for movement between covered and uncovered positions of said tool connector on the extending end of said shaft to block and permit access respectively to said tool connector.

5. The combination as set forth in claim 1 wherein:
a shaft is provided for actuation of said valve member and said fluid pressure responsive means includes a fluid responsive piston about said shaft;
said body defining a first annular fluid chamber adjacent an inner end of said piston in fluid communication with said flow line, and a second annular fluid chamber about said piston in fluid communication with the other of said fluid chambers in opposed relation to said first annular fluid chamber, said second fluid chamber having a fluid pressure responsive area greater than the fluid pressure responsive area of said first fluid chamber to provide a fluid pressure differential acting against said piston.

6. Lockout means for the actuating shaft of a valve member for separating a pair of fluid chambers in an orifice fitting device to permit the removal of an orifice plate in a flow line, the actuating shaft having a tool connector adjacent an end of said shaft located externally of the orifice fitting device and adapted for engagement with a suitable tool for rotation of said shaft and movement of said valve member; said lockout means comprising:

a body extending about said shaft adjacent the tool connector on said shaft externally of the orifice fitting device; and fluid pressure responsive means mounted within said outer body and movable between a position for blocking actuation of said valve member and a position for permitting actuation of said valve member;

said fluid pressure responsive means responsive to a fluid pressure differential in said chambers and movable to a position for blocking actuation of said valve member when a fluid pressure differential exists in said chambers, and movable to a position for permitting actuation of said valve member when the fluid pressure in said fluid chambers is equalized.

7. Lockout means as set forth in claim 6 wherein:

said fluid responsive means in an extended position includes a projection positioned over said tool connector to block access to said tool connector by a manual actuating tool when a differential fluid pressure exists in said chambers.

8. Lockout means as set forth in claim 7 wherein:

said fluid responsive means includes a piston in fluid communication adjacent one portion thereof with fluid pressure in one of said fluid chambers, and in fluid communication adjacent an opposed portion thereof with fluid pressure from the other of said fluid chambers.

9. Lockout means as set forth in claim 6 wherein:

threaded means are provided to permit said lockout means to be utilized as a retrofit unit on existing orifice fitting devices having said actuating shaft extending externally of the orifice fitting device, said threaded means including an externally threaded nut for engaging an internally threaded opening receiving said actuating shaft.

* * * * *